May 28, 1968     R. L. LICHTEN ETAL     3,385,537
ROTOR-WING LOAD TRANSFER DEVICE

Filed Oct. 4, 1965     2 Sheets-Sheet 1

INVENTORS
ROBERT L. LICHTEN
CHARLES M. SEIBEL
BY
*George Galvestin*
ATTORNEY

INVENTOR.
ROBERT L. LICHTEN
CHARLES M. SEIBEL
ATTORNEY

United States Patent Office

3,385,537
Patented May 28, 1968

3,385,537
ROTOR-WING LOAD TRANSFER DEVICE
Robert L. Lichten, Dallas, and Charles M. Seibel, Fort Worth, Tex., assignors to Bell Aerospace Corporation, a corporation of New York
Filed Oct. 4, 1965, Ser. No. 492,520
1 Claim. (Cl. 244—6)

ABSTRACT OF THE DISCLOSURE

Acceleration sensing device on a winged helicopter provides automatic control inputs to collective pitch control system in response to maneuvering of the helicopter so as to cause wing to carry substantial portion of increased lift load produced by maneuver.

---

This invention relates to rotary wing aircraft. In particular, it relates to helicopters with fixed wings, known as winged helicopters.

The lift capability of a rotor progressively decays with increase in flight speed (due to the tendency toward blade stall). A means to compensate for this loss of rotor lift capability at high speeds has been to add a fixed wing to the craft, the wing increasing its lift with increasing forward speed and thus reducing the lift requirements on the rotor.

However, during maneuvers in which the angle of attack of the aircraft is increased, for example pull-ups, turns, sudden stops, etc., as well as in gusty air, the rotor lift increases more rapidly than the fixed wing lift and thus the rotor blades can be rapidly driven into a stalled condition which tends to produce unacceptable vibrations and damaging structural loadings. This characteristic of the rotor limits the maximum speed of the craft that would otherwise be usable with the wing-rotor combination since some maneuvering capability must be provided at all airspeeds to permit changes in the direction of flight. Accordingly, it is an object of this invention to permit increased usable speed of winged helicopters.

It is an object of this invention to provide means for load-distribution between rotor and wing.

It is also an object of this invention to reduce rotor hub and blade loads and airframe vibrations during maneuvers.

It is a further object of this invention to minimize loads in the helicopter control system.

The invention operates to achieve the objects noted in the following general manner. When the craft is caused to maneuver and aerodynamically load the rotor, or if this occurs as a result of a gust, an acceleration sensing device will cause a control change in the collective pitch system in the direction to alleviate the increase in rotor thrust, i.e., a reduction in collective pitch on the rotor blades. This reduction in collective pitch will "unload" the rotor and effect a transfer in load from the rotor to the wing. Stated another way, the reduction in pitch on the rotor restricts the rotor lift and permits the wing to provide most of the increase in lift required to perform the desired maneuver.

Figure 1:
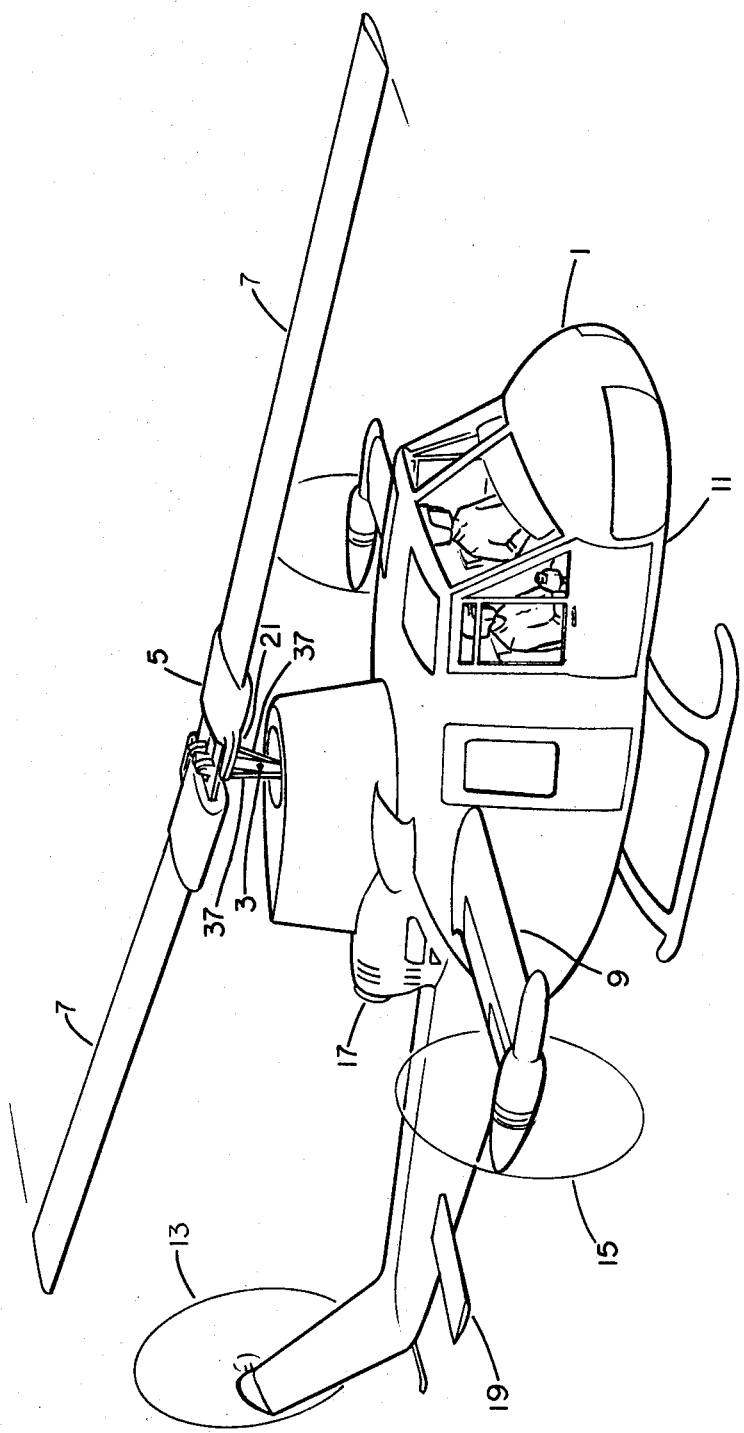
FIG. 1 illustrates a helicopter to which the invention is applicable.

Referring to FIG. 1, the helicopter 1 has fuselage 11 and rotor 5 with blades 7 mounted on mast 3 extending upwardly from the fuselage. The mast 3 and rotor 5 are driven by engine 17. Wings 9 extend from both sides of fuselage 17 and propellers 15 are mounted on the outboard ends of the wings to provide auxiliary propulsion. Horizontal fin 19 extends from the aft section of the fuselage, and tail rotor 13 provides direction control. It will be appreciated that our invention is fully applicable to all rotary wing aircraft employing non-rotary wings (conventionally referred to as fixed-wings) whether or not auxiliary propulsion means (such as the propellers 15 in the helicopter illustrated in FIG. 1) are used.

Figure 2:
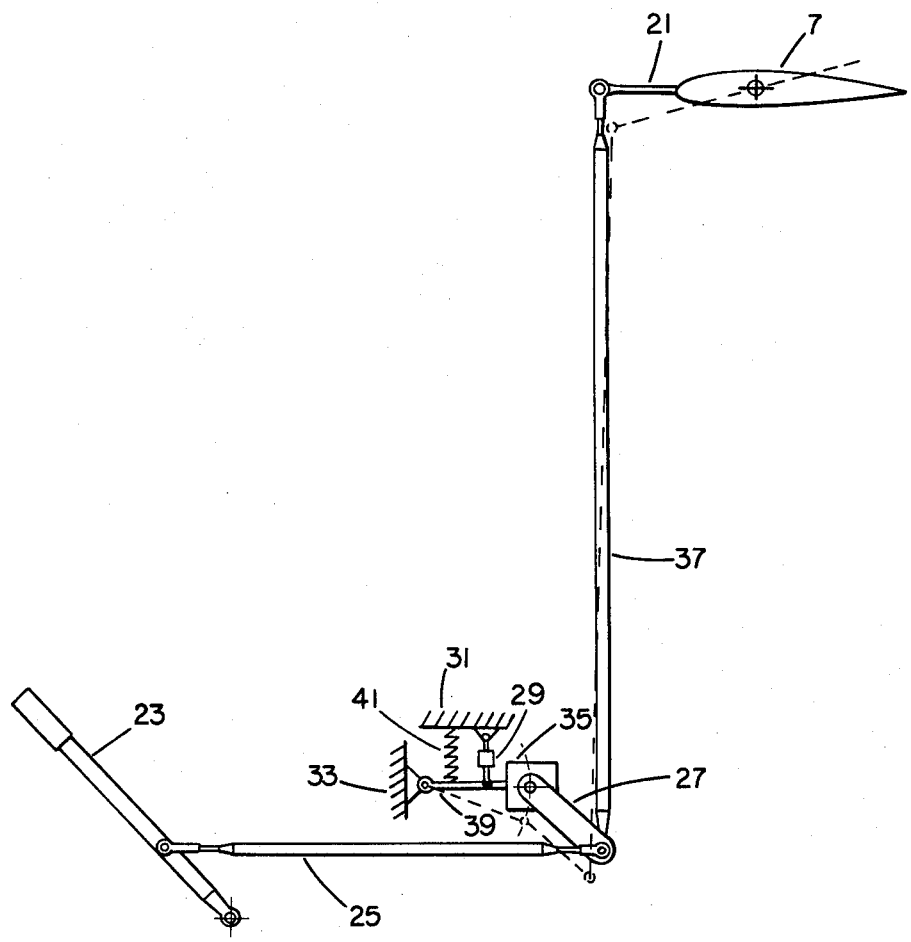
FIG. 2 illustrates an embodiment of the invention as applied to the collective pitch control system of the aircraft of FIG. 1.

Referring to FIG. 2, the pilot's collective pitch stick 23 is connected to and actuates control rod 25 which is pivotally attached to one end of lever 27 that is in turn pivotally attached to inertia means 35. The inertia means is rigidy fixed to lever 39 which pivots on fuselage lug 33. A control rod 37 extends from lever 27 to the pitch horn 21 of blade 7. Only one blade and its control connections are illustrated, but the collective pitch control system actuates all the rotor blades of the helicopter at the same time in the same direction and in the same amount in any of various ways, all well known in the helicopter art. The spring 41, attached to the fuselage lug 31 and to lever 39 acts to support the inertia means 35 in a neutral position while dashpot 29 damps the movement of the inertia means.

Operation of the collective pitch system is conventional, movement of the collective pitch stick 23 actuating the connecting rods and levers and causing the blades to change pitch. As can be appreciated, the inertia means 35 and the pilot's control stick 23 are interconnected so as to provide "differential" inputs to the collective pitch system. That is, a control input from the stick or the inertia means will either add to or subtract from the control input of the other, depending upon the direction of movement of each. For example, if the control stick were to be raised from its illustrated position (FIG. 2) the blade pitch would be increased by that motion; if, at the same time, the inertia means were to descend, that would cause a decrease in the blade pitch and the net pitch change on the blade would be the difference in pitch change caused by the two control inputs.

In the case of a maneuver causing a high loading on the rotor the craft will accelerate with an upward component. The inertia means 35 will tend to remain in its original position in space. However, proportionate to the load imposed on the rotor, that is the severity of the maneuver and the number of g's pulled, the inertia means will move downwardly relative to the craft, thus reducing the rotor's collective pitch, as indicated in FIG. 2, to unload the rotor and permit the wings to carry a larger share of the load.

While the specific embodiment described herein uses a weighted body or inertia means as its acceleration sensor, the invention is not limited thereto and any type of acceleration sensor, mechanical, electrical, hydraulic, aerodynamic, etc. may serve for the same purpose.

Although only one form of the invention has been shown and described in detail it will be apparent to those skilled in the art that the invention is not so limited but that various changes may be made therein without departing from the spirit of the invention or the scope of the appended claim.

We claim:

1. In a pitch changeable rotary wing aircraft with fixed wing, the improvement comprising: acceleration sensing means responsive to positive acceleration of said aircraft, and rotor blade pitch change means actuable by said acceleration sensing means to simultaneously decrease the pitch of all the lift producing pitch changeable rotary wings of said aircraft.

References Cited

UNITED STATES PATENTS

| 2,743,071 | 4/1956 | Kelley | 244—17.13 |
| 3,010,679 | 11/1961 | Kelley | 244—17.13 |
| 3,155,341 | 11/1964 | Girard | 244—7 |

MILTON BUCHLER, *Primary Examiner.*

T. W. BUCKMAN, *Assistant Examiner.*